United States Patent
Wang et al.

(10) Patent No.: US 11,382,086 B2
(45) Date of Patent: Jul. 5, 2022

(54) METHOD OF TRANSMITTING DOWNLINK CONTROL CHANNEL, METHOD AND DEVICE OF DETECTING AND RECEIVING DOWNLINK CONTROL CHANNEL

(71) Applicant: CHINA ACADEMY OF TELECOMMUNICATIONS TECHNOLOGY, Beijing (CN)

(72) Inventors: Lei Wang, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 134 days.

(21) Appl. No.: 16/759,264

(22) PCT Filed: Oct. 18, 2018

(86) PCT No.: PCT/CN2018/110813
§ 371 (c)(1),
(2) Date: Apr. 24, 2020

(87) PCT Pub. No.: WO2019/080767
PCT Pub. Date: May 2, 2019

(65) Prior Publication Data
US 2020/0404629 A1    Dec. 24, 2020

(30) Foreign Application Priority Data

Oct. 26, 2017  (CN) .......................... 201711015157.1
Nov. 17, 2017  (CN) .......................... 201711147610.4

(51) Int. Cl.
*H04W 72/04*    (2009.01)

(52) U.S. Cl.
CPC ..... *H04W 72/042* (2013.01); *H04W 72/0446* (2013.01)

(58) Field of Classification Search
CPC .......................... H04W 72/042; H04W 72/0446
USPC .......................................................... 370/336
See application file for complete search history.

(56) References Cited

U.S. PATENT DOCUMENTS

| 2014/0177556 A1 | 6/2014 | Pan et al. |
| 2015/0189628 A1 | 7/2015 | Pan et al. |
| 2016/0380742 A1 | 12/2016 | Suzuki et al. |

(Continued)

FOREIGN PATENT DOCUMENTS

| CN | 102202324 A | 9/2011 |
| CN | 102883368 A | 1/2013 |
| CN | 103889039 A | 6/2014 |

(Continued)

OTHER PUBLICATIONS

First office action and search report from CN app. No. 201711147610. 4, dated Dec. 31, 2019, with English translation provided by Global Dossier.

(Continued)

*Primary Examiner* — Peter G Solinsky
(74) *Attorney, Agent, or Firm* — Ladas & Parry, LLP

(57) ABSTRACT

A method and device of transmitting a downlink control channel, a method and device of detecting and receiving a downlink control channel are provided. The method includes: determining a blind detection period parameter of the downlink control channel; and transmitting the downlink control channel based the blind detection period parameter of the downlink control channel.

20 Claims, 6 Drawing Sheets

(56) References Cited

U.S. PATENT DOCUMENTS

2017/0325257 A1   11/2017   Liu

FOREIGN PATENT DOCUMENTS

| CN | 106793136 A | 5/2017 |
| --- | --- | --- |
| CN | 107222926 A | 9/2017 |
| WO | 2015/079972 A1 | 6/2015 |

OTHER PUBLICATIONS

"Multi-beam transmission for DL control channel", R1-1713756, 3GPP TSG RAN WG1 Meeting #90, Prague, Czech Republic, Aug. 21-25, 2017.
International Search Report from PCT/CN2018/110813, dated Jan. 21, 2019, with English translation from WIPO.
Written Opinion of the International Searching Authority from PCT/CN2018/110813, dated Jan. 21, 2019, with English translation from WIPO.
Internationnal Preliminary Report on Patentability from PCT/CN2018/110813, dated Apr. 28, 2020, with English translation from WIPO.
"Configurable DL control channel monitoring for power savings", R1-1704574, 3GPP TSG RAN WG1 Meeting #88bis, Spokane, USA, Apr. 3-7, 2017.
"Discussion on search space design", R1-1715871, 3GPP TSG RAN WG1 Meeting NR#3, Nagoya, Japan, Sep. 18-21, 2017.
Notification of Reasons for Refusal from KR app. No. 10-2020-7013681, dated Apr. 16, 2021, with English translation from Global Dossier.
"On DL control channel monitoring", R1-1707381, 3GPP TSG RAN WG1 #89, Hangzhou, P.R. China, May 15-19, 2017.
"Discussion on NR-PDCCH monitoring", R1-1707496, 3GPP TSG RAN WG1 #89, Hangzhou, P.R. China, May 15-19, 2017.
"C-DRX with Multiple Configurations", R2-1706683, 3GPP TSG-RAN WG2 NR AH#2, Qingdao, P.R. China, Jun. 27-29, 2017.
Extended European Search Report from EP app. No. 18870327.6, dated Nov. 30, 2020.
Notice of Reason for Refusal for JP app. No. 2020-523308, dated Aug. 17, 2021, with English translation from Global Dossier, all pages.

US 11,382,086 B2

METHOD OF TRANSMITTING DOWNLINK CONTROL CHANNEL, METHOD AND DEVICE OF DETECTING AND RECEIVING DOWNLINK CONTROL CHANNEL

CROSS-REFERENCE TO RELATED APPLICATIONS

The present application is the U.S. national phase of PCT Application No. PCT/CN2018/110813 filed on Oct. 18, 2018, which claims priority to the Chinese patent application No. 201711015157.1 filed on Oct. 26, 2017 and priority to the Chinese patent application No. 201711147610.4 filed on Nov. 17, 2017, the disclosures of which are incorporated herein by reference in their entireties.

TECHNICAL FIELD

The present disclosure relates to the field of communication technology, in particular to a method of transmitting a downlink control channel, and a method and device of detecting and receiving the downlink control channel.

BACKGROUND

In an existing Long Term Evolution (LTE) system, the length of the transmission time interval (TTI) is fixed at 1 millisecond (ms), and one or more Physical Downlink Control Channel (PDCCH) is transmitted on the first N Orthogonal Frequency Division Multiplexing (OFDM) symbols of each TTI or on a set of physical resource block (PRB) pairs in the data region or on multiple continuous or discontinuous sub-frames, a User Equipment (UE) blindly detect its own PDCCH in Common Search Space (CSS) of each non-Discontinuous Reception (non-DRX) sub-frame or a UE-specific Search Space (USS) based on expected information.

In a future mobile communication system, for different service types, the downlink control channel needs to implement data transmission at different time intervals, for example, the data transmission is implemented once in each slot or once in every N slots. In addition, the time domain length of each slot will vary according to the subcarrier spacing.

However, there is no a clear solution on how to determine a slot where the UE monitors a downlink control channel.

SUMMARY

Regarding the above technical problem, embodiments of the present disclosure provide a method and device of transmitting a downlink control channel, a method and a device of detecting and receiving a downlink control channel, so as to solve the problem in the related art that there is no solution on how to determine a time-frequency resource for the UE to monitor a downlink control channel.

In a first aspect, the present disclosure provides a method of transmitting a downlink control channel applied for a base station, includes: determining a blind detection period parameter of the downlink control channel; and transmitting the downlink control channel based the blind detection period parameter of the downlink control channel.

In an embodiment of the present disclosure, the blind detection period parameter of the downlink control channel at least comprises: an offset value and/or a period value, wherein the offset value indicates an offset of a time domain resource for a user equipment (UE) to detect and receive the downlink control channel within a predetermined time domain range, the period value indicates a period for the UE to detect and receive the downlink control channel, a unit of the offset value and the period value is the same as the time domain resource.

In an embodiment of the present disclosure, the blind detection period parameter of the downlink control channel is a predetermined blind detection period parameter of the downlink control channel.

In an embodiment of the present disclosure, the blind detection period parameter of the downlink control channel is configured by the base station.

In an embodiment of the present disclosure, the offset value is configured as an arbitrary integer less than a maximum number of time domain resources included in a predetermined time domain range.

In an embodiment of the present disclosure, the offset value is configured to be selected from a specific set of offset values.

In an embodiment of the present disclosure, the specific set of offset values is configured by the base station, or the specific set of offset values is defined through a protocol.

In an embodiment of the present disclosure, the period value is configured to be selected from a predetermined set of period values.

In an embodiment of the present disclosure, the predetermined time domain range is continuous time units in the time domain.

In an embodiment of the present disclosure, the transmitting the downlink control channel based the blind detection period parameter of the downlink control channel includes: determining a time domain resource for transmitting the downlink control channel based on the offset value and/or the period value; and transmitting the downlink control channel on the time domain resource.

In an embodiment of the present disclosure, the determining a time domain resource for transmitting the downlink control channel based on the offset value and the period value includes: determining the time domain source for transmitting downlink control channel by using a formula $(W \times n_f \times 2^k + n_s - T_{offset}) \mod T_{period} = 0$; wherein W is a predetermined time domain range, $n_f$ is a serial number of the predetermined time domain range; $2^k$ is a quantity of time domain resources corresponding to different subcarrier spacings (SCSs) within a predetermined time unit, k being a parameter related to a subcarrier spacing in the predetermined time domain range, $n_s$ is a serial number of the time domain resource within the predetermined time domain rang, $T_{offset}$ is the offset value, and $T_{period}$ is the period value.

In an embodiment of the present disclosure, the determining a time domain resource for transmitting the downlink control channel based on the offset value includes: determine the time domain source for transmitting the downlink control channel by using a formula $(W \times n_f \times 2^k + n_s - T_{offset}) = 0$, wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value.

In an embodiment of the present disclosure, the determining a time domain resource for transmitting the downlink control channel based on the period value includes: determining the time domain source for transmitting downlink control channel by using a formula $(W \times n_f \times 2^k + n_s) \mod$ $T_{period}=0$; wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, and $T_{period}$ is the period value.

In an embodiment of the present disclosure, the method further includes notifying the UE of the blind detection period parameter of the downlink control channel.

In an embodiment of the present disclosure, the notifying the UE of the blind detection period parameter of the downlink control channel includes: transmitting the blind detection period parameter of the downlink control channel to the UE through high layer signaling or master information block (MIB) information.

In a second aspect, a method of detecting and receiving a downlink control channel applied for a UE, includes: determining a blind detection period parameter of the downlink control channel; and detecting and receiving the downlink control channel based on the blind detection period parameter of the downlink control channel.

In an embodiment of the present disclosure, the blind detection period parameter of the downlink control channel at least comprises: an offset value and/or a period value, wherein the offset value indicates an offset of a time domain resource for the UE to detect and receive the downlink control channel within a predetermined time domain range, the period value indicates a period for the UE to detect and receive the downlink control channel, a unit of the offset value and the period value is the same as the time domain resource.

In an embodiment of the present disclosure, the blind detection period parameter of the downlink control channel is a predetermined blind detection period parameter of the downlink control channel.

In an embodiment of the present disclosure, the determining a blind detection period parameter of the downlink control channel includes: receiving the blind detection period parameter of the downlink control channel configured by the base station.

In an embodiment of the present disclosure, the receiving the blind detection period parameter of the downlink control channel configured by the base station includes: receiving high layer signaling or master information block (MIB) information including the blind detection period parameter of the downlink control channel.

In an embodiment of the present disclosure, the offset value is configured as an arbitrary integer less than a maximum number of time domain resources included in a predetermined time domain range.

In an embodiment of the present disclosure, the offset value is configured to be selected from a specific set of offset values.

In an embodiment of the present disclosure, the specific set of offset values is configured by the base station, or the specific set of offset values is defined through a protocol.

In an embodiment of the present disclosure, the period value is configured to be selected from a predetermined set of period values.

In an embodiment of the present disclosure, the predetermined time domain range is continuous time units in the time domain.

In an embodiment of the present disclosure, the detecting and receiving the downlink control channel based the blind detection period parameter of the downlink control channel includes: determining a time domain resource for detecting and receiving the downlink control channel based on the offset value and/or the period value; and detecting and receiving the downlink control channel on the time domain resource.

In an embodiment of the present disclosure, the determining a time domain resource for detecting and receiving the downlink control channel based on the offset value and the period value includes: determining the time domain source for detecting and receiving downlink control channel by using a formula $(W \times n_f \times 2^k + n_s - T_{offset}) \bmod T_{period}=0$; wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value, and $T_{period}$ is the period value.

In an embodiment of the present disclosure, the determining a time domain resource for detecting and receiving the downlink control channel based on the offset value includes: determining the time domain source for detecting and receiving the downlink control channel by using a formula $(W \times n_f \times 2^k + n_s - T_{offset})=0$, wherein W is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value.

In an embodiment of the present disclosure, the determining a time domain resource for detecting and receiving the downlink control channel based on the period value includes: determining the time domain source for detecting and receiving downlink control channel by using a formula $(W \times n_f \times 2^k + n_s) \bmod T_{period}=0$; wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, and $T_{period}$ is the period value.

In a third aspect, a base station includes: a first processor, configured to determine a blind detection period parameter of a downlink control channel; and a first transceiver, configured to transmit the downlink control channel based the blind detection period parameter of the downlink control channel.

In an embodiment of the present disclosure, the blind detection period parameter of the downlink control channel at least comprises: an offset value and/or a period value, wherein the offset value indicates an offset of a time domain resource for a user equipment (UE) to detect and receive the downlink control channel within a predetermined time domain range, the period value indicates a period for the UE to detect and receive the downlink control channel, a unit of the offset value and the period value is the same as the time domain resource.

In an embodiment of the present disclosure, the blind detection period parameter of the downlink control channel is a predetermined blind detection period parameter of the downlink control channel.

In an embodiment of the present disclosure, the blind detection period parameter of the downlink control channel is configured by the base station.

In an embodiment of the present disclosure, the offset value is configured as an arbitrary integer less than a maximum number of time domain resources included in a predetermined time domain range.

In an embodiment of the present disclosure, the offset value is configured to be selected from a specific set of offset values.

In an embodiment of the present disclosure, the specific set of offset values is configured by the base station, or the specific set of offset values is defined through a protocol.

In an embodiment of the present disclosure, the period value is configured to be selected from a predetermined set of period values.

In an embodiment of the present disclosure, the predetermined time domain range is continuous time units in the time domain.

In an embodiment of the present disclosure, the first processor is further configured to determine a time domain resource for transmitting the downlink control channel based on the offset value and/or the period value; and the first transceiver is further configured to transmit the downlink control channel on the time domain resource.

In an embodiment of the present disclosure, the first processor is further configured to determine the time domain source for transmitting downlink control channel by using a formula $(W \times n_f \times 2^k + n_s - T_{offset}) \bmod T_{period} = 0$; wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value, and $T_{period}$ is the period value.

In an embodiment of the present disclosure, the first processor is further configured to determine the time domain source for transmitting the downlink control channel by using a formula $(W \times n_f \times 2^k + n_s - T_{offset}) = 0$, wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value.

In an embodiment of the present disclosure, the first processor is further configured to determining the time domain source for transmitting downlink control channel by using a formula $(W \times n_f \times 2^k + n_s) \bmod T_{period} = 0$; wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, and $T_{period}$ is the period value.

In an embodiment of the present disclosure, the first transceiver is further configured to notify the UE of the blind detection period parameter of the downlink control channel.

In an embodiment of the present disclosure, the first transceiver is further configured to transmit the blind detection period parameter of the downlink control channel to the UE through high layer signaling or master information block (MIB) information.

In a fourth aspect, a UE includes: a second processor, configured to determine a blind detection period parameter of the downlink control channel; and a second transceiver, configured to detect and receive the downlink control channel based on the blind detection period parameter of the downlink control channel.

In an embodiment of the present disclosure, the blind detection period parameter of the downlink control channel at least comprises: an offset value and/or a period value, wherein the offset value indicates an offset of a time domain resource for the UE to detect and receive the downlink control channel within a predetermined time domain range, the period value indicates a period for the UE to detect and receive the downlink control channel, a unit of the offset value and the period value is the same as the time domain resource.

In an embodiment of the present disclosure, the blind detection period parameter of the downlink control channel is a predetermined blind detection period parameter of the downlink control channel.

In an embodiment of the present disclosure, the second transceiver is further configured to receive the blind detection period parameter of the downlink control channel configured by the base station.

In an embodiment of the present disclosure, the second transceiver is further configured to receive high layer signaling or master information block (MIB) information including the blind detection period parameter of the downlink control channel.

In an embodiment of the present disclosure, the offset value is configured as an arbitrary integer less than a maximum number of time domain resources included in a predetermined time domain range.

In an embodiment of the present disclosure, the offset value is configured to be selected from a specific set of offset values.

In an embodiment of the present disclosure, the specific set of offset values is configured by the base station, or the specific set of offset values is defined through a protocol.

In an embodiment of the present disclosure, the period value is configured to be selected from a predetermined set of period values.

In an embodiment of the present disclosure, the predetermined time domain range is continuous time units in the time domain.

In an embodiment of the present disclosure, the second processor is further configured to determine a time domain resource for detecting and receiving the downlink control channel based on the offset value and/or the period value; the second transceiver is further configured to detect and receive the downlink control channel on the time domain resource.

In an embodiment of the present disclosure, the second processor is further configured to determine the time domain source for detecting and receiving downlink control channel by using a formula $(W \times n_f \times 2^k + n_s - T_{offset}) \bmod T_{period} = 0$; wherein W is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value, and $T_{period}$ is the period value.

In an embodiment of the present disclosure, the second processor is further configured to determine the time domain source for detecting and receiving the downlink control channel by using a formula $(W \times n_f \times 2^k + n_s - T_{offset}) = 0$, wherein W is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, $T_{offset}$ is the offset value.

In an embodiment of the present disclosure, the second processor is further configured to determine the time domain source for detecting and receiving downlink control channel by using a formula $(W \times n_f \times 2^k + n_s) \bmod T_{period} = 0$; wherein w is a predetermined time domain range, $n_f$ is a serial number of the predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within the predetermined time domain rang, and $T_{period}$ is the period value.

In a fifth aspect, a base station includes a memory, a processor, a transceiver and a computer program stored in the memory and executed by the processor, wherein the processor is configured to execute the computer program so as to implement the method of transmitting a downlink control channel.

In a sixth aspect, a UE includes a memory, a processor, a transceiver, and a computer program stored in the memory and executed by the processor, wherein the processor is configured to execute the computer program so as to implement the method of detecting and receiving a downlink control channel.

In a seventh aspect, a computer-readable storage medium storing therein a computer program, wherein the computer program is executed by a processor so as to implement the method of transmitting a downlink control channel, or the method of detecting and receiving a downlink control channel.

Thus, the UE may determine the period for detecting and receiving the downlink control channel, thereby increasing system flexibility and reducing power consumption on the UE side.

DETAILED DESCRIPTION

Figure 1:
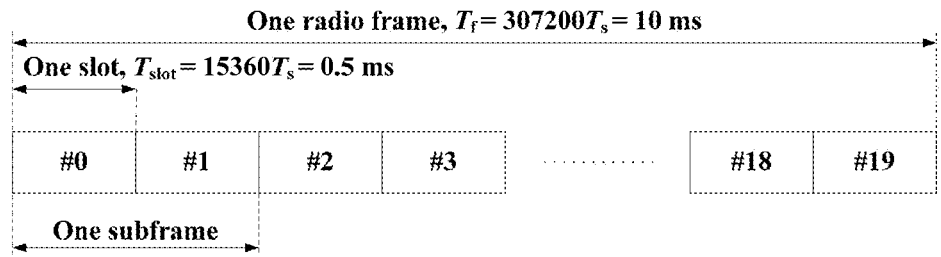
FIG. 1 is a schematic diagram of an LTE radio frame structure type 1.

In order to describe the technical solution of embodiments of the present disclosure more clearly, the drawings used in the embodiments of the present disclosure will be briefly introduced below. Obviously, the drawings in the following description are only some embodiments of the present disclosure. Those skilled in the art can also obtain other drawings according to these drawings without creative work.

The term "and/or" is only a kind of association relationship describing related objects, which means that there can be three kinds of relationships, for example, A and/or B means only A, only B or both A and B.

The terms "first" and "second" in the specification and claims of the present disclosure are used to distinguish different objects, rather than to describe a specific order of these objects. For example, a first processor and a second processor are used to distinguish different processors, rather than to describe a specific order of the processors.

In the embodiments of the present disclosure, the words "exemplary" or "for example" are used as describe examples or illustrations. Any embodiment or design described as "exemplary" or "for example" in the present disclosure should not be construed as more preferred or advantageous over other embodiments or designs. Rather, the use of the words "exemplary" or "for example" is intended to present a relevant concept in a concrete manner.

Some technical points are introduced firstly as follows.

1) Next-Generation Mobile Communication Technology

Mobile Internet is changing the traditional mobile communication model, providing users with an unprecedented experience, and profoundly affecting all aspects of people's work and life. The mobile Internet will promote further upgrading of information interaction way, and provide users with richer experiences such as enhanced reality, virtual reality, ultra-high definition (3D) video, and mobile cloud. The further development of the mobile Internet will bring about mobile traffic increased in thousands times in the future and promote a new round of changes in mobile communication technology and industry. The Internet of Things (IoT) has expanded the coverage of mobile communication services, from person-to-person communication to people-to-things, things-to-things intelligent interconnection, and applies the mobile communication technology into a wider range of industries and fields. In the future, mobile medical services, Internet of vehicles, smart home appliances, industrial control, and environmental monitoring will drive explosive growth in IoT applications. Hundreds of billions of devices will be connected to the network to achieve a true "Internet of Everything." At the same time, massive device connections and diverse IoT services will also bring new technical challenges to mobile communications.

With the continuous emergence and enrichment of new business requirements, higher performance requirements are proposed for future mobile communication systems, such as higher peak rates, better user experience, smaller delays, higher reliability, higher spectrum efficiency and higher energy consumption efficiency, etc. In addition, it needs to support more user access and various service types. In order to support a large number of various types of terminal connections and different service types, flexible allocation of uplink and downlink resources has become a major trend in technological development. In the future, system resources can be divided into different sub-bands based on different services, and TTIs of different lengths can be divided on the sub-bands to meet various service requirements.

2) LTE Sub-Frame Structure in Related Art

In the related art, an LTE Frequency Division Dual (FDD) system uses a frame structure type (FS1), and its structure is shown in FIG. 1. In a FDD system, uplink and downlink transmissions are implemented at different carrier frequencies, and a same frame structure is used in both uplink and downlink transmissions. In each carrier, a radio frame of 10 ms includes ten sub-frames of 1 ms, and each sub-frame is divided into two time domain resources of 0.5 ms. TTI length of uplink and downlink data transmission is 1 ms.

Figure 2:
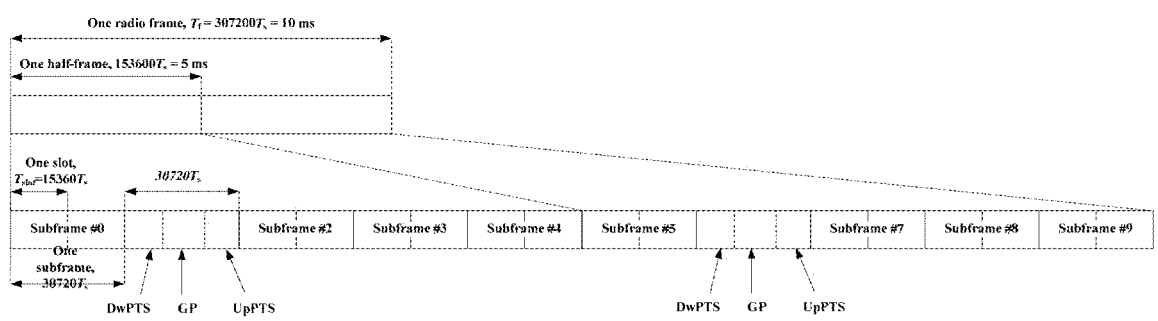
FIG. 2 is a schematic diagram of an LTE radio frame structure type 2.

In the related art, an LTE Time Division Duplexing (TDD) system uses a frame structure type (FS2), as shown in FIG. 2. In a TDD system, different sub-frames or different time domain resources on the same frequency are used for uplink and downlink transmissions. In FS2, each radio frame of 10 ms includes two half-frames of 5 ms, and each half-frame includes five sub-frames of 1 ms. The sub-frames in FS2 are divided into three types: downlink sub-frames, uplink sub-frames, and special sub-frames. Each special sub-frame consists of Downlink Pilot Time Slot (DwPTS), Guard Period (GP) and Uplink Pilot Time Slot (UpPTS). Among them, DwPTS can used to transmit downlink pilots, downlink service data and downlink control signaling. GP is not used to transmit any signals. UpPTS is only used to transmit random access and sounding reference symbols (SRS), and cannot be used to transmit uplink services or uplink control information. Each half-frame includes at least one downlink sub-frame and at least one uplink sub-frame, and at most one special sub-frame. Seven uplink and downlink sub-frame configuration modes supported in FS2 are shown in Table 1.

TABLE 1

| Uplink-downlink configurations | | | | | | | | | | | |
|---|---|---|---|---|---|---|---|---|---|---|---|
| Uplink and downlink sub-frame configuration | uplink and downlink sub-frame handover period | sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

| Uplink-downlink configurations | | | | | | | | | | | |
|---|---|---|---|---|---|---|---|---|---|---|---|
| Uplink and downlink sub-frame configuration | uplink and downlink sub-frame handover period | sub-frame number | | | | | | | | | |
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(3) LTE Downlink Control Channel in Related Art 3.1 PDCCH

PDCCH of the LTE system is used to carry scheduling information and other control information. There can be a plurality of PDCCHs in the control region of each downlink sub-frame. The size of the control region is determined by the Physical Control Format Indicator Channel (PCFICH), which occupies 1 to 4 OFDM symbols. Transmission of one control channel occupies one Control Channel Element (CCE) or multiple consecutive CCEs, each CCE is composed of 9 Resource Element Groups (REGs), and the REG included in CCE of PDCCH is a REG that is not used to carry Physical Control Format Indicator Channel (PCFICH) and Physical Hybrid ARQ Indicator Channel (PHICH). The UE monitors the PDCCH candidate set in a non-DRX sub-frame, that is, UE tries to decode each PDCCH in the search space based on Downlink Control Information (DCI) format to be monitored.

3.2 Enhanced Physical Downlink Control Channel (EPDCCH)

In order to extend the capacity of PDCCH, EPDCCH was introduced in the R11 version (Rel-11). EPDCCH is transmitted in a data region of a sub-frame, and cannot occupy the transmission space of PDCCH. The UE having EPDCCH detects and receives the EPDCCH in a PRB set configured in each sub-frame.

3.3 MPDCCH

An enhanced MTC (EMTC) UE detects and receives MPDCCH on one or more sub-frames configured in a higher layer.

Figure 3:
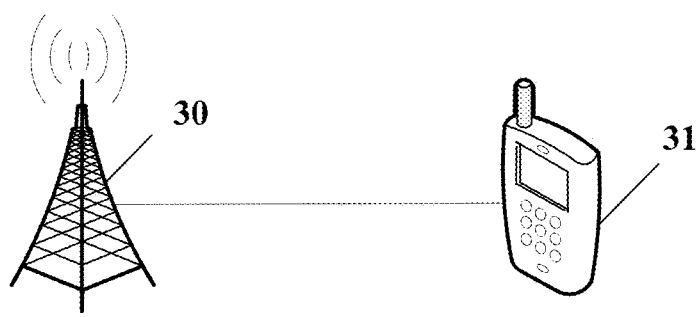
FIG. 3 is a schematic structural diagram of a wireless communication system according to an embodiment of the present disclosure.

The embodiments of the present disclosure are described below with reference to the drawings. The method of transmitting a downlink control channel, the method and a device of receiving a downlink control channel provided by the embodiments of the present disclosure can be applied to a wireless communication system. The wireless communication system may be a system adopting a 5th generation (5G) mobile communication technology (hereinafter referred to as a 5G system). Referring to FIG. 3, it is a schematic structural diagram of a wireless communication system according to an embodiment of the present disclosure. As shown in FIG. 3, the wireless communication system may include a network device 30 and a UE, denoted as UE 31, and UE 31 may communicate with the network device 30. In practical applications, the connection between the foregoing devices may be a wireless connection. In order to conveniently and intuitively represent the connection relationship between the various devices, a solid line is used in FIG. 3.

It should be noted that the above communication system may include a plurality of UEs, the network equipment may communicate with the plurality of UEs (transmitting signaling or data).

The network device provided in the embodiment of the present disclosure may be a base station, and the network device may be a commonly used base station, an evolved node base station (eNB), or a network device in a 5G system, for example, a next generation node base station (gNB) or a transmission and reception point (TRP), or other equipment.

The UE provided in the embodiment of the present disclosure may be a mobile phone, a tablet computer, a notebook computer, an Ultra-Mobile Personal Computer (UMPC), a netbook, or a Personal Digital Assistant (PDA).

Figure 4:
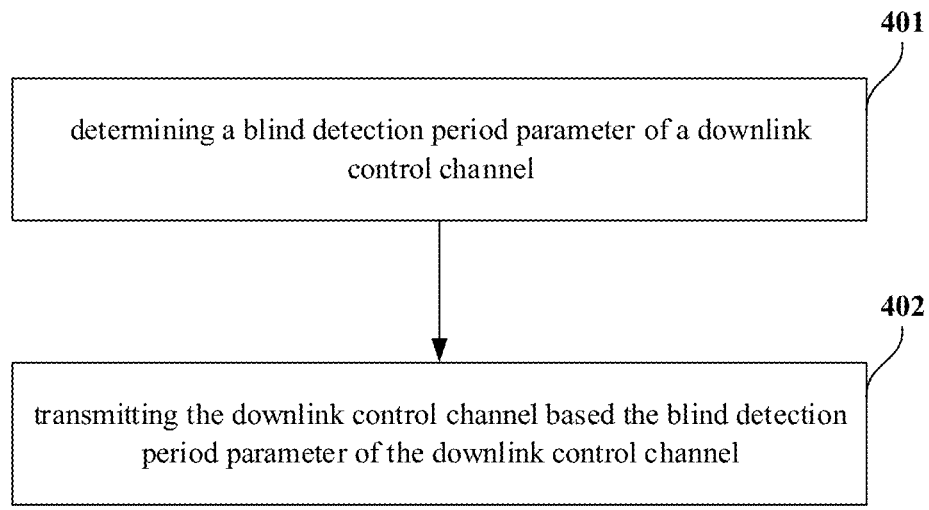
FIG. 4 is a first flowchart of a method of transmitting a downlink control channel according to an embodiment of the present disclosure.

Referring to FIG. 4, a flowchart of a method of transmitting a downlink control channel is shown. The method may be applied for a base station. The method includes the following steps.

Step 401: determining a blind detection period parameter of a downlink control channel.

The above-mentioned blind detection period parameter of the downlink control channel is used to indicate a period during which the UE detects and receives the downlink control channel.

In the embodiment of the present disclosure, the blind detection period parameter of the downlink control channel at least includes: an offset value and/or a period value, where the offset value indicates an offset of a time domain resource used for the UE to detect and receive the downlink control channel within a predetermined time domain range. The period value indicates the period for the UE to detect and receive the downlink control channel. The unit of the offset value and the period value is the same as the time domain resource. For example, the unit of the offset value and the period value is a slot.

The above-mentioned time domain resource may be a slot, or a time-frequency resource having a unit smaller than a slot, such as a mini-slot, which is not limited herein.

The foregoing predetermined time domain range is a continuous time unit in the time domain, for example, the time unit is 10 ms, which is not limited herein.

Step 402: transmitting the downlink control channel based the blind detection period parameter of the downlink control channel.

In an embodiment of the present disclosure, the blind detection period parameter of the downlink control channel may be defined in a predefined manner, that is, the blind detection period parameter of the downlink control channel is a predetermined blind detection period parameter of the downlink control channel. For example, the blind detection period parameter of the downlink control channel are defined through a protocol, and the base station transmits the downlink control channel on a specific time-frequency resource, that is, the offset value and the period value are determined. The period of the search space of the downlink control channel scheduling remaining system information (RMSI) can be determined by the protocol.

In another embodiment of the present disclosure, the blind detection period parameter of the downlink control channel can be configured by the base station, that is, the blind detection period parameter of the downlink control channel is configured by the base station, so that the base station can configure different detection and reception periods for the UE based on different service types and to different application scenarios, thereby increasing system flexibility and reducing power consumption.

In the embodiment of the present disclosure, the offset value may be configured by the base station to an arbitrary integer less than a maximum number of time domain resources included in a predetermined time domain range. For example, if the predetermined time domain range includes L time domain resources, the base station configures any integer less than L as an offset value, and the L may be 10 or 20, which is not limited herein.

In the embodiment of the present disclosure, the offset value may be configured by the base station by selecting from a specific set of offset values. Further, the specific set of offset values is configured by the base station, for example, the specific set of offset values is configured through explicit signaling, or the specific set of offset values is defined through a protocol.

In the embodiment of the present disclosure, the period value is configured by the base station by selecting from a predetermined set of period values.

In the embodiment of the present disclosure, if the blind detection period parameter of the downlink control channel is configured by the base station, the method further includes: notifying the UE of the blind detection period parameter of the downlink control channel. For example, the blind detection period parameter of the downlink control channel is transmitted to the UE through high layer signaling (such as Radio Resource Control (RRC) signaling) or master information block (MIB) information.

In this way, the UE can determine the period for detecting and receiving the downlink control channel, thereby increasing system flexibility, and reducing power consumption on the UE side.

Figure 5:
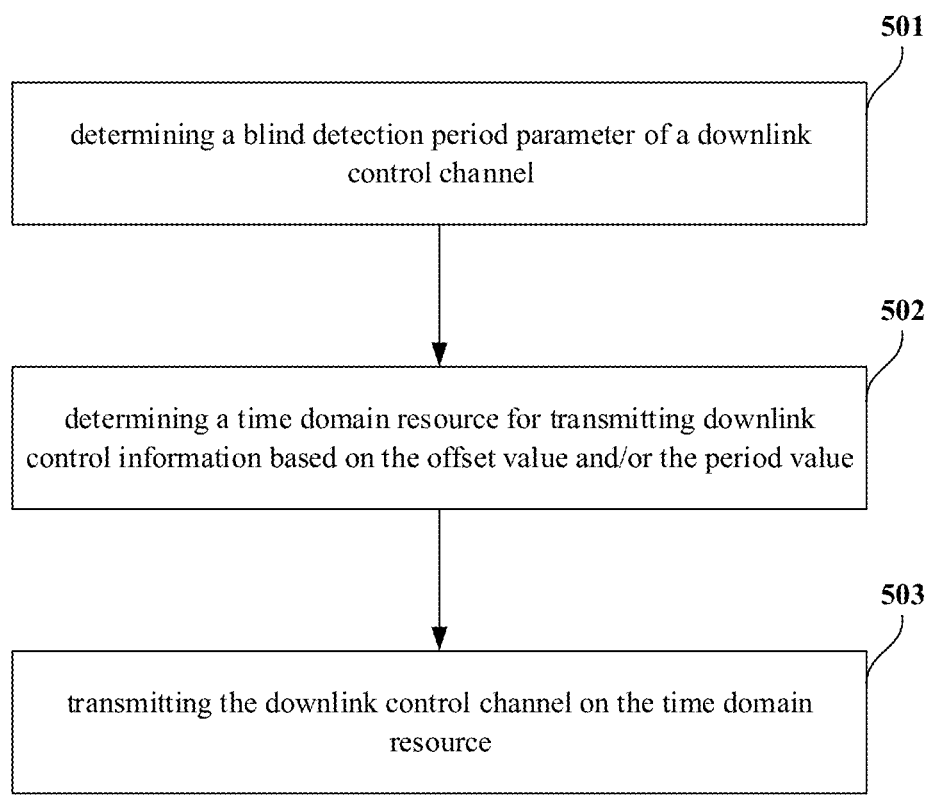
FIG. 5 is a second flowchart of a method of transmitting a downlink control channel according to an embodiment of the present disclosure.

Referring to FIG. 5, a flowchart of a method of transmitting a downlink control channel is shown. The method may applied for a base station. The specific steps are as follows.

Step 501: determining a blind detection period parameter of a downlink control channel.

In the embodiment of the present disclosure, the blind detection period parameter of the downlink control channel at least includes: an offset value and/or a period value, where the offset value indicates an offset of a time domain resource used for the UE to detect and receive the downlink control channel within a predetermined time domain range. The period value indicates the period for the UE to detect and receive the downlink control channel. The unit of the offset value and the period value is the same as the time domain resource. For example, the unit of the offset value and the period value is a slot.

The above-mentioned time domain resource may be a slot, or a time-frequency resource having a unit smaller than a slot, such as a mini-slot, which is not limited herein.

The foregoing predetermined time domain range is a continuous time unit in the time domain, for example, the time unit is 10 ms, which is not limited herein.

Step 502: determining a time domain resource for transmitting downlink control information based on the offset value and/or the period value.

For example, the formula $(W \times n_f \times 2^k + n_s - T_{offset}) \bmod T_{period} = 0$ is used to determine the time domain resource for transmitting downlink control information; where W is a predetermined time domain range, for example, W=10 ms, of course, it is not limited to herein; $n_f$ is a serial number of a predetermined time domain range; $2^k$ is a quantity of time domain resources corresponding to different SCSs within a predetermined time unit (for example, the predetermined time unit is 1 ms), and k is a parameter related to the subcarrier spacing, for example, k may be a value from the set $\{0, 1, 2, 3, 4, 5\}$, of course, k is not limited herein, and the set from which the value of k is taken may be determined based on the subcarrier spacing in a future system.

$n_s$ is a serial number of the time domain resource within a predetermined time domain range, for example, $n_s=0, \ldots, 10 \cdot 2^k - 1$.

$T_{offset}$ is the offset value. $T_{period}$ is the period value.

Further, the position of the time domain resource for transmitting the downlink control channel may also be determined only by the offset value or the period value. For example, when the time domain resource for transmitting the downlink control channel is determined only based on the offset value, it is determined by the following formula, which means that the base station implements transmission on a fixed time domain resource within each time domain range.

$$(W \times n_f \times 2^k + n_s - T_{offset}) = 0$$

As another example, when the time domain resource for transmitting the downlink control channel is determined only based on the period value, it is determined by the following formula: $(W \times n_f \times 2^k + n_s) \bmod T_{period} = 0$ Step 503: transmitting the downlink control channel on the time domain resource.

In an embodiment of the present disclosure, the blind detection period parameter of the downlink control channel may be defined in a predefined manner, that is, the blind detection period parameter of the downlink control channel is a predetermined blind detection period parameter of the downlink control channel. For example, the blind detection period parameters of the downlink control channel are defined through the protocol, and the base station transmits the downlink control channel on a specific time-frequency resource, that is, the offset value and the period value are determined. For example, the period of the search space of the downlink control channel scheduling remaining system information (RMSI) can be determined by the protocol.

In another embodiment of the present disclosure, the blind detection period parameter of the downlink control channel can be configured by the base station, that is, the blind detection period parameter of the downlink control channel is configured by the base station.

In the embodiment of the present disclosure, the offset value may be configured by the base station to an arbitrary integer less than a maximum number of time domain resources included in a predetermined time domain range. For example, if the predetermined time domain range includes L time domain resources, the base station configures any integer less than L as an offset value, and the L may be 10 or 20, which is not limited herein.

In the embodiment of the present disclosure, the offset value may be configured by the base station by selecting from a specific set of offset values. Further, the specific set of offset values is configured by the base station, or the specific set of offset values is defined through a protocol.

In the embodiment of the present disclosure, the period value is configured by the base station by selecting from a predetermined set of period values.

In an embodiment of the present disclosure, the method further includes: notifying a UE of the blind detection period parameter of the downlink control channel. For example, the blind detection period parameter of the downlink control channel is transmitted to the UE through high layer signaling (such as RRC signaling) or master information block (MIB) information.

In this way, the UE can determine the period for detecting and receiving the downlink control channel, thereby increasing system flexibility, and reducing power consumption on the UE side.

Figure 6:
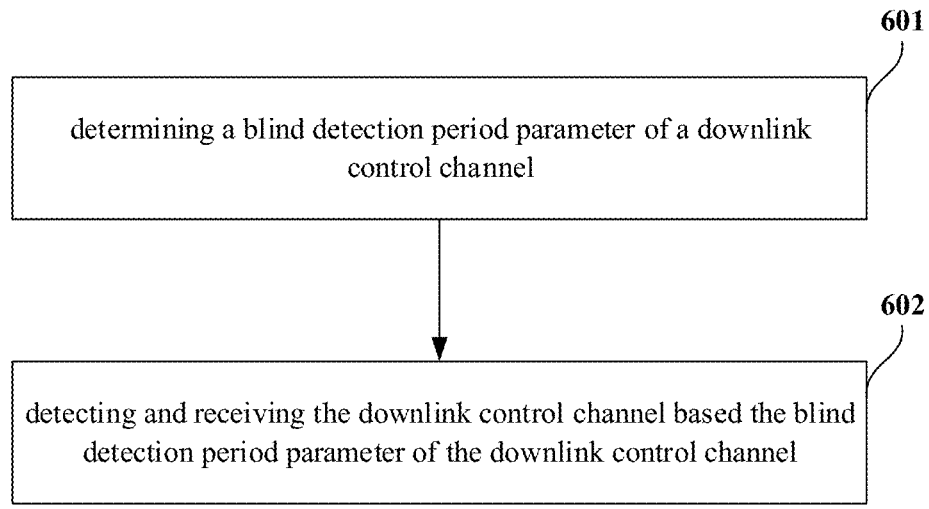
FIG. 6 is a third flowchart of a method of transmitting a downlink control channel according to an embodiment of the present disclosure.

Referring to FIG. 6, a flowchart of a method of detecting and receiving a downlink control channel is shown. The method is applied for a UE. The specific steps are as follows.

Step 601: determining a blind detection period parameter of a downlink control channel.

In the embodiment of the present disclosure, the blind detection period parameter of the downlink control channel at least includes: an offset value and/or a period value, where the offset value indicates an offset of a time domain resource used for the UE to detect and receive the downlink control channel within a predetermined time domain range. The period value indicates the period for the UE to detect and receive the downlink control channel. The unit of the offset value and the period value is the same as the time domain resource. For example, the unit of the offset value and the period value is a slot.

The above-mentioned time domain resource may be a slot, or a time-frequency resource having a unit smaller than a slot, such as a mini-slot, which is not limited herein.

The foregoing predetermined time domain range is a continuous time unit in the time domain, for example, the time unit is 10 ms, which is not limited herein.

Step 602: detecting and receiving the downlink control channel based the blind detection period parameter of the downlink control channel.

In an embodiment of the present disclosure, the blind detection period parameter of the downlink control channel is a predetermined blind detection period parameter of the downlink control channel. For example, the blind detection period parameter of the downlink control channel are defined through a protocol, and the base station transmits the downlink control channel on a specific time-frequency resource, that is, the offset value and the period value are determined. The period of the search space of the downlink control channel scheduling remaining system information (RMSI) can be determined by the protocol.

In another example of the embodiment of the present disclosure, the blind detection period parameter of the downlink control channel configured by a base station is received. For example, the high layer signaling (such as RRC signaling) or master information block (MIB) information is received, the high layer signaling or MIB information includes the blind detection period parameter of the downlink control channel configured by a base station.

That is, the blind detection period parameter of the downlink control channel is configured by the base station, so that the base station can configure different detection and reception period of the downlink control channel for the UE based on different service types or different application scenarios, thereby increasing system flexibility and reducing power consumption of the UE side.

In the embodiment of the present disclosure, the offset value may be configured by the base station to an arbitrary integer less than a maximum number of time domain resources included in a predetermined time domain range. For example, if the predetermined time domain range includes L time domain resources, the base station configures any integer less than L as an offset value, and the L may be 10 or 20, which is not limited herein.

In the embodiment of the present disclosure, the offset value may be configured by the base station by selecting from a specific set of offset values. Further, the specific set of offset values is configured by the base station or the specific set of offset values is defined through a protocol.

In the embodiment of the present disclosure, the period value is configured by the base station by selecting from a predetermined set of period values.

In this way, the UE can determine the period for detecting and receiving the downlink control channel, thereby increasing system flexibility, and reducing power consumption on the UE side.

Figure 7:
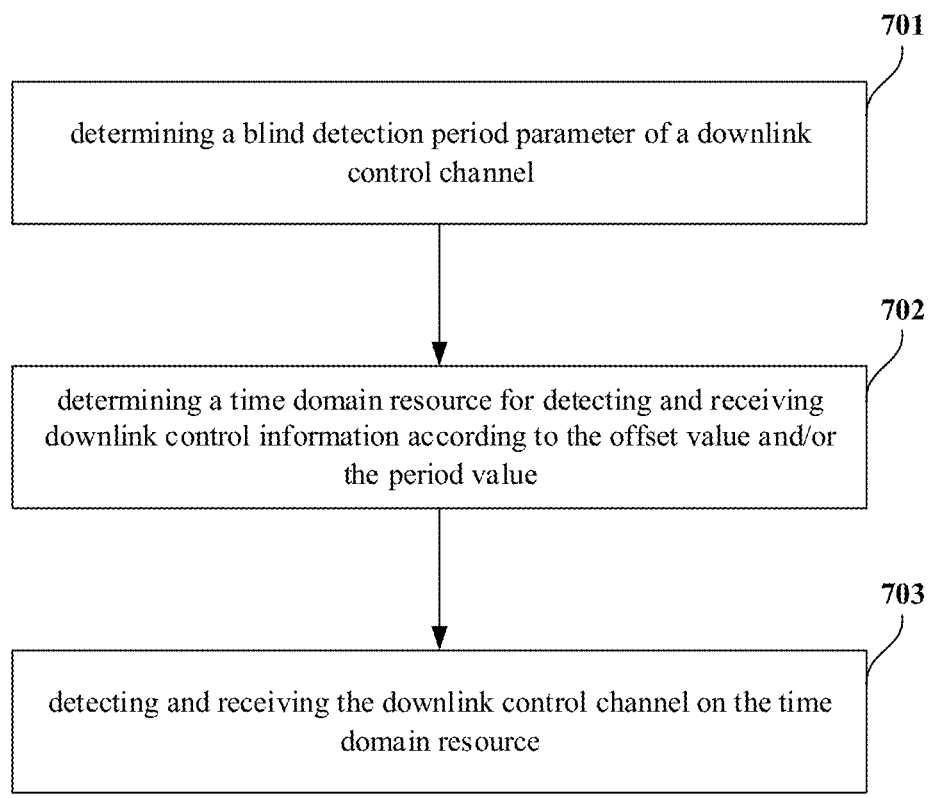
FIG. 7 is a fourth flowchart of a method of transmitting a downlink control channel according to an embodiment of the present disclosure.

Referring to FIG. 7, a flowchart of a method of detecting and receiving a downlink control channel is shown. The method is applied for a UE. The specific steps are as follows.

Step 701: determining a blind detection period parameter of a downlink control channel.

In the embodiment of the present disclosure, the blind detection period parameter of the downlink control channel at least includes: an offset value and/or a period value, where the offset value indicates an offset of a time domain resource used for the UE to detect and receive the downlink control channel within a predetermined time domain range. The period value indicates the period for the UE to detect and receive the downlink control channel. The unit of the offset value and the period value is the same as the time domain resource. For example, the unit of the offset value and the period value is a slot.

The above-mentioned time domain resource may be a slot, or a time-frequency resource having a unit smaller than a slot, such as a mini-slot, which is not limited herein.

Step 702: determining a time domain resource for detecting and receiving downlink control information according to the offset value and/or the period value.

For example, the formula $(W \times n_f \times 2^k + n_s - T_{offset}) \mod T_{period} = 0$ is used to determine the time domain resource for transmitting downlink control information; where W is a predetermined time domain range, for example, W=10 ms, of course, it is not limited to herein; $n_f$ is a serial number of a predetermined time domain range; $2^k$ is a quantity of time domain resources corresponding to different SCSs within a predetermined time unit (for example, the predetermined time unit is 1 ms), and k is a parameter related to the subcarrier spacing, for example, k may be a value from the set $\{0, 1, 2, 3, 4, 5\}$, of course, k is not limited herein, and the set from which the value of k is taken may be determined based on the subcarrier spacing in a future system.

$n_s$ is a serial number of the time domain resource within a predetermined time domain range, for example, $n_s = 0, \ldots, 10 \cdot 2^k - 1$.

$T_{offset}$ is the offset value. $T_{period}$ is the period value.

Further, the time domain resource for detecting and receiving the downlink control channel may also be determined by the offset value or the period value. For example, when the time domain resource for detecting and receiving the downlink control channel is determined only based on the offset value, it is determined by the following formula, which means that the UE detects and receives the downlink control channel on a fixed time domain resource within each time domain range.

$$(W \times n_f \times 2^k + n_s - T_{offset}) = 0$$

As another example, when the time domain resource for detecting and receiving the downlink control channel is determined only based on the period value, it is determined by the following formula: $(W \times n_f \times 2^k + n_s) \mod T_{period} = 0$ Step 703: detecting and receiving the downlink control channel on the time domain resource.

In an embodiment of the present disclosure, the blind detection period parameter of the downlink control channel is a predetermined blind detection period parameter of the downlink control channel. For example, the blind detection period parameters of the downlink control channel are defined through the protocol, and the base station transmits the downlink control channel on a specific time-frequency resource, that is, the offset value and the period value are determined. For example, the period of the search space of the downlink control channel scheduling remaining system information (RMSI) can be determined by the protocol.

In an embodiment of the present disclosure, the blind detection period parameter of the downlink control channel configured by the base station is received. For example, high layer signaling (such as RRC signaling) or master information block (MIB) information including the blind detection period parameter of the downlink control channel configured by the base station are received.

That is, the blind detection period parameter of the downlink control channel is configured by the base station. The base station may configure different detection and reception periods of the downlink control channel based on different service types and different application scenarios, thereby increasing system flexibility, and reducing power consumption on the UE side.

In the embodiment of the present disclosure, the offset value may be configured by the base station to an arbitrary integer less than a maximum number of time domain resources included in a predetermined time domain range. For example, if the predetermined time domain range includes L time domain resources, the base station configures any integer less than L as an offset value, and the L may be 10 or 20, which is not limited herein.

In the embodiment of the present disclosure, the offset value may be configured by the base station by selecting from a specific set of offset values. Further, the specific set of offset values is configured by the base station, or the specific set of offset values is defined through a protocol.

In the embodiment of the present disclosure, the period value is configured by the base station by selecting from a predetermined set of period values.

In this way, the UE can determine the period for detecting and receiving the downlink control channel, thereby increasing system flexibility, and reducing power consumption on the UE side.

Example 1

Assume that the base station configures a related parameter of the time domain resource number for blindly detecting the downlink control channel in a radio frame (that is, 10 ms) for the UE.

Assuming a time domain range, that is, the subcarrier spacing in one radio frame is 15 kHz, the parameter k related to the subcarrier spacing is equal to 0, that is, the time domain length of a time domain resource is 1 ms.

The related parameter configured by the base station for the UE-specific PDCCH of the UE are an offset value $T_{offset} = 0$ and a period value $T_{period} = 2$. The units of the offset value and the period value are both a unit of time domain resources. Then the UE determines the time domain range, that is, a position of the time domain resource for detecting and receiving the downlink control channel in one radio frame based on the following formula. For example, when the base station configures $T_{offset}$, the base station can configure $T_{offset}$ to any integer less than 10, or configure $T_{offset}$ to select from a specific set of offset values, for example, a set of offset values is $\{0, 2, 4, 8\}$.

UE receives high layer signaling, such as RRC signaling. The high layer signaling carries the related parameters $T_{offset} = 0$ and $T_{period} = 2$, which are configured by the base station and used for blindly detecting the time domain resource number of the downlink control channel. The UE determines the number of the time domain resource for detecting and receiving the downlink control channel based on the following formula.

$$(10 \times n_f \times 2^k + n_s - T_{offset}) \bmod T_{period} = 0$$

In the first radio frame, $n_f=0$, and the time domain resource numbers that meet the above formula are 0, 2, 4, 6, and 8. Then, the UE needs to detect and receive the downlink control channel on time domain resource #0, time domain resource #2, time domain resource #4, time domain resource #6, and time domain resource #8.

Figure 8:
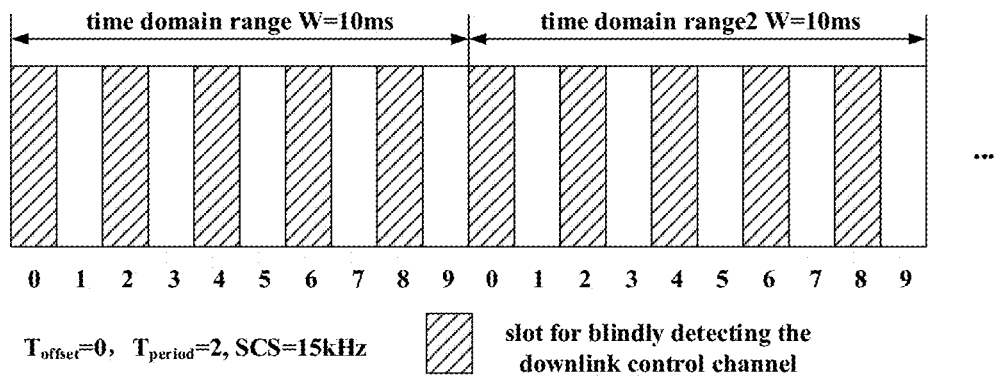
FIG. 8 is a schematic diagram of a terminal that needs to blindly detect time-frequency resources of a downlink control channel according to an embodiment of the present disclosure.

In the second radio frame, $n_f=1$, and the time domain resources numbers that meet the above formula are 0, 2, 4, 6, and 8. Then the UE needs to detect and receive the downlink control channel on time domain resource #0, time domain resource #2, time domain resource #4, slot #6, slot #8 as shown in FIG. 8.

It should be noted that the above-mentioned time domain resource may represent a slot or a time domain resource having a unit smaller than a slot, such as a mini-slot, which is not limited herein.

Example 2

Assume that the base station configures a related parameter of the time domain resource number for blindly detecting the downlink control channel in a radio frame (that is, 10 ms) for the UE.

Assuming a time domain range, that is, the subcarrier spacing in one radio frame is 30 kHz, the parameter related to the subcarrier spacing is equal to 1, that is, the time domain length of a time domain resource is 0.5 ms.

The related parameter configured by the base station for the UE-specific PDCCH of the UE are an offset value $T_{offset}=2$ and a period value $T_{period}=4$. The units of the offset value and the period value are both a unit of time domain resources. Then the UE determines the time domain range, that is, a position of the time domain resource for detecting and receiving the downlink control channel in one radio frame based on the following formula. For example, when the base station configures $T_{offset}$, the base station can configure $T_{offset}$ to any integer less than 20, or configure $T_{offset}$ to select from a specific set of offset values, for example, a set of offset values is {0, 2, 4, 8, 10, 12, 14, 16, 18}.

UE receives high layer signaling, such as RRC signaling. The high layer signaling carries the related parameters $T_{offset}=2$ and $T_{period}=4$, which are configured by the base station and used for blindly detecting the time domain resource number of the downlink control channel. The UE determines the number of the time domain resource for detecting and receiving the downlink control channel based on the following formula.

$$(10 \times n_f \times 2^k + n_s - T_{offset}) \bmod T_{period} = 0$$

Figure 9:
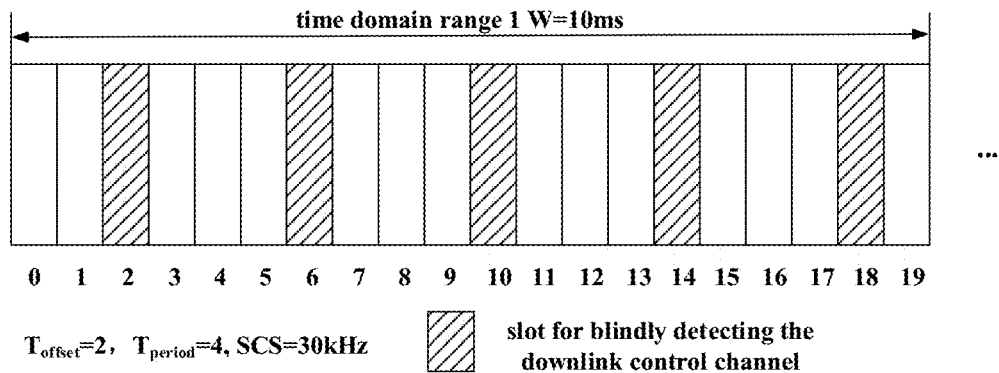
FIG. 9 is another schematic diagram of a terminal that needs to blindly detect time-frequency resources of a downlink control channel according to an embodiment of the present disclosure.

In the first radio frame, $n_f=0$, and the time domain resource numbers that meet the above formula are 2, 6, 10, 14 and 18. Then, the UE needs to detect and receive the downlink control channel on time domain resource #2, time domain resource #6, time domain resource #10, time domain resource #14, and time domain resource #18, as shown in FIG. 9.

It should be noted that the above-mentioned time domain resource may represent a slot or a time domain resource having a unit smaller than a slot, such as a mini-slot, which is not limited herein.

Example 3

For a common downlink control channel, such as a downlink control channel that schedules the transmission of the remaining system information (RMSI), the related parameters for detecting and receiving the downlink control channel by the UE can be determined by being predefined in the protocol, such as the offset value $T_{offset}$ and the period value $T_{period}$ are fixed values predefined in the protocol. UE needs to determine the time domain resources for detecting and receiving the downlink control channel based on the fixed values predefined in the protocol.

It should be noted that the above-mentioned time domain resource may represent a slot or a time domain resource having a unit smaller than a slot, such as a mini-slot, which is not limited herein.

Example 4

For a common downlink control channel, for example, a downlink control channel for scheduling RMSI transmission, the related parameters for detecting and receiving the downlink control channel may be notified to UE through MIB information carried in the Physical Broadcast Channel (PBCH). For example, the MIB information indicates the values of the offset value $T_{offset}$ and the period value $T_{period}$.

For example, $T_{offset}$ has N possible values, $T_{period}$ has M possible values, the MIB information needs ceil (log 2 (N)) bits to indicate the value of $T_{offset}$, and ceil (log 2 (M)) bits to indicate the value of $T_{period}$.

Alternatively, the MIB information indicates a combination of $T_{offset}$ and $T_{period}$. As shown in the table below. For example, if the corresponding indication bit in the MIB information is 00, $T_{offset}=N1$ and $T_{period}=M1$. Of course, the embodiments of the present disclosure do not limit the values of specific combinations.

| Combination | $T_{offset}$ | $T_{period}$ |
| --- | --- | --- |
| 00 | N1 | M1 |
| 01 | N2 | M1 |
| 10 | N1 | M2 |
| 11 | N2 | M2 |

After determining the values of $T_{offset}$ and $T_{period}$, the terminal determines time domain resources for detecting and receiving PDCCH that schedules the RMSI based on the formula in Example 1 or Example 2.

It should be noted that the above-mentioned time domain resource may represent a slot or a time domain resource having a unit smaller than a slot, such as a mini-slot, which is not limited in the embodiments of the present disclosure.

Example 5

The method in Example may also be applied to the downlink control channels and indication signaling in Example 1 and 2, and which is not limited herein.

It should be noted that, the embodiments of the present disclosure may be refer to contents described in the foregoing Example 1 and Example 2, and details are not repeated herein again.

Example 6

Assumed that the UE needs to detect and receive a group common PDCCH that carry pre-emption indication information. The UE may determine to detect and receive the slot position or mini-slot position of the group common PDCCH that carry the pre-emption indication $T_{period}$ information by using one or more methods as described in Examples 1 to 5.

Of course, may take a value different from the detection period of other downlink control channels, and optionally the value depends on the configuration on the base station side.

A base station is also provided in the embodiment of the present disclosure. Since the principle of the base station to solve the problem is similar to the method of transmitting a downlink control channel in the embodiments of the present disclosure, the implementation of the base station can refer to the implementation of the method, which will not be repeated herein.

Figure 10:
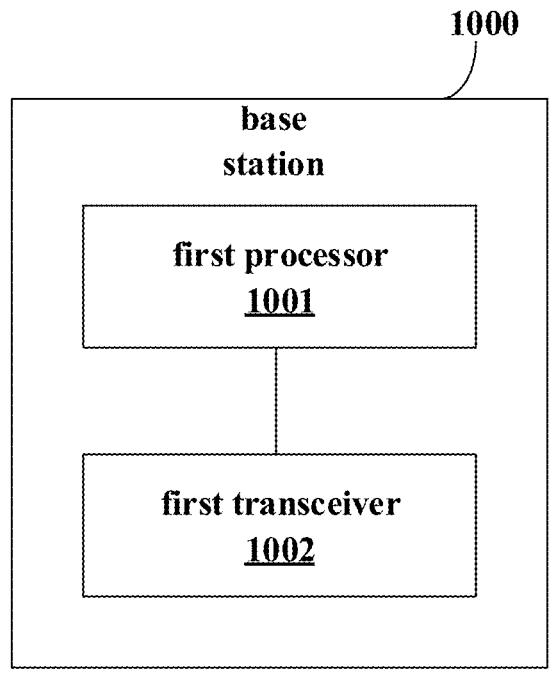
FIG. 10 is a schematic structural diagram of a base station according to an embodiment of the present disclosure.

FIG. 10 shows a structure of a base station. The base station 1000 includes: a first processor 1001, configured to determine a blind detection period parameter of a downlink control channel; and a first transceiver 1002, configured to transmit the downlink control channel based on the blind detection period parameter of the downlink control channel.

In the embodiment of the present disclosure, the blind detection period parameter of the downlink control channel at least includes: an offset value and/or a period value, where the offset value indicates an offset of a time domain resource used for the UE to detect and receive the downlink control channel within a predetermined time domain range. The period value indicates the period for the UE to detect and receive the downlink control channel. The unit of the offset value and the period value is the same as the time domain resource.

In the embodiment of the present disclosure, the blind detection period parameter of the downlink control channel is a predetermined blind detection period parameter of the downlink control channel.

In the embodiment of the present disclosure, the blind detection period parameter of the downlink control channel is configured by the base station.

In the embodiment of the present disclosure, the offset value is configured as an arbitrary integer less than a maximum number of time domain resources included in a predetermined time domain range.

In the embodiment of the present disclosure, the offset value is configured to be selected from a specific set of offset values.

In the embodiment of the present disclosure, the specific set of offset values is configured by a base station, or the specific set of offset values is defined through a protocol.

In the embodiment of the present disclosure, the period value is configured to be selected from a predetermined set of period values.

In the embodiment of the present disclosure, the predetermined time domain range is a continuous time unit in the time domain.

In the embodiment of the present disclosure, the first processor 1001 is further configured to determine a time domain resource for transmitting downlink control information based on the offset value and/or the period value.

The first transceiver 1002 is further configured to transmit the downlink control channel on the time domain resource.

In the embodiment of the present disclosure, the first processor 1001 is further configured to determine a time domain for transmitting downlink control information by using a formula $(W \times n_f \times 2^k + n_s - T_{offset}) \bmod T_{period} = 0$. Where W is a predetermined time domain range, $n_f$ is a serial number of a predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within a predetermined time domain rang; $T_{offset}$ is the offset value, and $T_{period}$ is the period value.

Further, the time domain resource for transmitting the downlink control channel may also be determined by the offset value or the period value. For example, when the time domain resource for transmitting the downlink control channel is determined only based on the offset value, it is determined by the following formula, $(W \times n_f \times 2^k + n_s - T_{offset}) = 0$ As another example, when the time domain resource for transmitting the downlink control channel is determined only based on the period value, it is determined by the following formula: $(W \times n_f \times 2^k + n_s) \bmod T_{period} = 0$ In the embodiment of the present disclosure, the first transceiver 1002 is further configured to notify a UE of the blind detection period parameter of the downlink control channel.

In the embodiment of the present disclosure, the first transceiver 1002 is further configured to transmit the blind detection period parameter of the downlink control channel to the UE through high layer signaling or master information block (MIB) information.

The base station provided by the embodiment of the present disclosure can execute the foregoing method, and its implementation principles and technical effects are similar. This embodiment will not be repeated herein.

The embodiment of the present disclosure also provides a UE. Since the principle of the UE to solve the problem is similar to the method for detecting and receiving a downlink control channel in the embodiment of the present disclosure, the implementation of the UE can refer to the implementation of the method, which will not be repeated herein.

Figure 11:
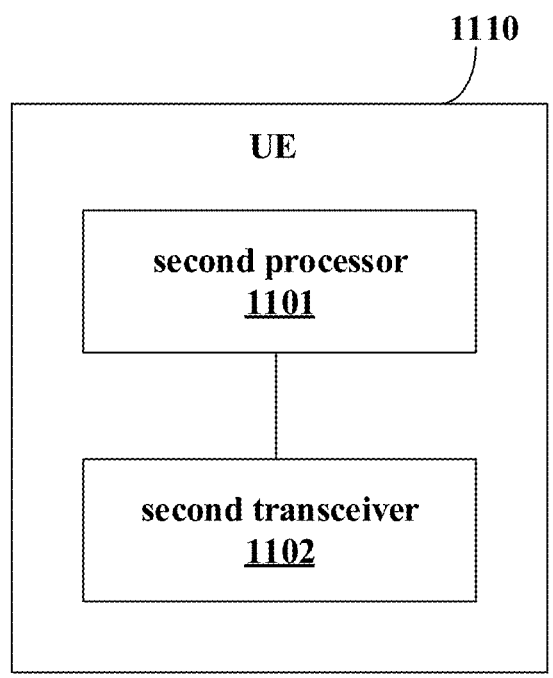
FIG. 11 is a schematic structural diagram of a user equipment according to an embodiment of the present disclosure.

FIG. 11 shows a structure of a UE. The UE 1100 includes: a second processor 1101, configured to determine a blind detection period parameter of a downlink control channel; and a second transceiver 1102, configured to detect and receive the downlink control channel based on the blind detection period parameter of the downlink control channel.

In the embodiment of the present disclosure, the blind detection period parameter of the downlink control channel at least includes: an offset value and/or a period value, where the offset value indicates an offset of a time domain resource used for the UE to detect and receive the downlink control channel within a predetermined time domain range. The period value indicates the period for the UE to detect and receive the downlink control channel. The unit of the offset value and the period value is the same as the time domain resource.

In the embodiment of the present disclosure, the blind detection period parameter of the downlink control channel is a predetermined blind detection period parameter of the downlink control channel.

In the embodiment of the present disclosure, the second transceiver 1102 is further configured to receive the blind detection period parameter of the downlink control channel configured by the base station.

In the embodiment of the present disclosure, the second transceiver 1102 is further configured to receive high layer signaling or master information block (MIB) information including the blind detection period parameter of the downlink control channel configured by the base station.

In the embodiment of the present disclosure, the offset value is configured as an arbitrary integer less than a maximum number of time domain resources included in a predetermined time domain range.

In the embodiment of the present disclosure, the offset value is configured to be selected from a specific set of offset values.

In the embodiment of the present disclosure, the specific set of offset values is configured by a base station, or the specific set of offset values is defined through a protocol.

In the embodiment of the present disclosure, the period value is configured to be selected from a predetermined set of period values.

In the embodiment of the present disclosure, the predetermined time domain range is a continuous time unit in the time domain.

In the embodiment of the present disclosure, the second processor 1101 is further configured to determine a time domain resource for detecting and receiving downlink control information based on the offset value and/or the period value.

The second transceiver 1102 is further configured to detect and receive the downlink control channel on the time domain resource.

In the embodiment of the present disclosure, the second processor 1101 is further configured to determine a time domain for detecting and receiving downlink control information by using a formula $(W \times n_f \times 2^k + n_s - T_{offset}) \bmod T_{period} = 0$. Where W is a predetermined time domain range, $n_f$ is a serial number of a predetermined time domain range; $2^k$ is a quantity of time domain resources corresponding to different SCSs within a predetermined time unit, k being a parameter related to a subcarrier spacing in the predetermined time domain range, $n_s$ is a serial number of the time domain resource within a predetermined time domain rang; $T_{offset}$ is the offset value, and $T_{period}$ is the period value.

Further, the time domain resource for detecting and receiving the downlink control channel may also be determined by the offset value or the period value. For example, when the time domain resource for detecting and receiving the downlink control channel is determined only based on the offset value, it is determined by the following formula, $(W \times n_f \times 2^k + n_s - T_{offset}) = 0$ As another example, when the time domain resource for detecting and receiving the downlink control channel is determined only based on the period value, it is determined by the following formula: $(W \times n_f \times 2^k + n_s) \bmod T_{period} = 0$ The UE provided by the embodiment of the present disclosure can execute the foregoing method, and its implementation principles and technical effects are similar. This embodiment will not be repeated herein.

Figure 12:
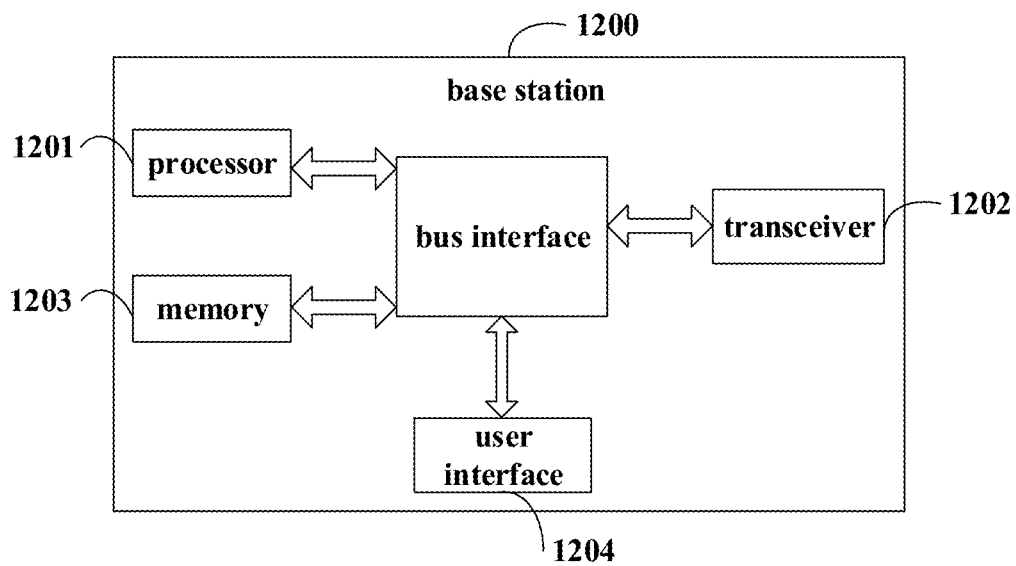
FIG. 12 is another schematic structural diagram of a base station according to an embodiment of the present disclosure.

An embodiment of the present disclosure provides a base station. FIG. 12 is a schematic structural diagram of the base station provided by an embodiment of the present disclosure. As shown in FIG. 12, the base station 1200 includes: a processor 1201, a transceiver 1202, a memory 1203, a user interface 1204, and a bus interface.

Among them, the processor 1201 may be used for managing the bus architecture and general processing. The memory 1203 may store data used by the processor 1201 to perform operations.

In the embodiment of the present disclosure, the base station 1200 may further include: a computer program stored in the memory 1203 and executed by the processor 1201. When the computer program is executed by the processor 1201, the following steps are performed: determining a blind detection period parameter of a downlink control channel; and transmitting the downlink control channel based on the blind detection period parameter of the downlink control channel.

In the drawings, the bus architecture may include any number of interconnected buses and bridges, and one or more processors specifically represented by the processor 1201 and the memory represented by the memory 1203 are linked together. The bus architecture can also link various other circuits such as peripheral devices, voltage regulators, and power management circuits, which are well known in the art, and will not described in detail herein. The bus interface provides an interface. The transceiver 1202 may be a plurality of elements, including a transmitter and a receiver, providing a unit for communicating with various other devices on a transmission medium. For different UEs, the user interface 1204 may also be an interface capable of externally or internally connecting required devices. The connected devices include, but are not limited to, a keypad, a display, a speaker, a microphone, a joystick, and the like.

The processor 1201 is used for managing the bus architecture and general processing, and the memory 1203 may store data used by the processor 1201 to perform operations.

Figure 13:
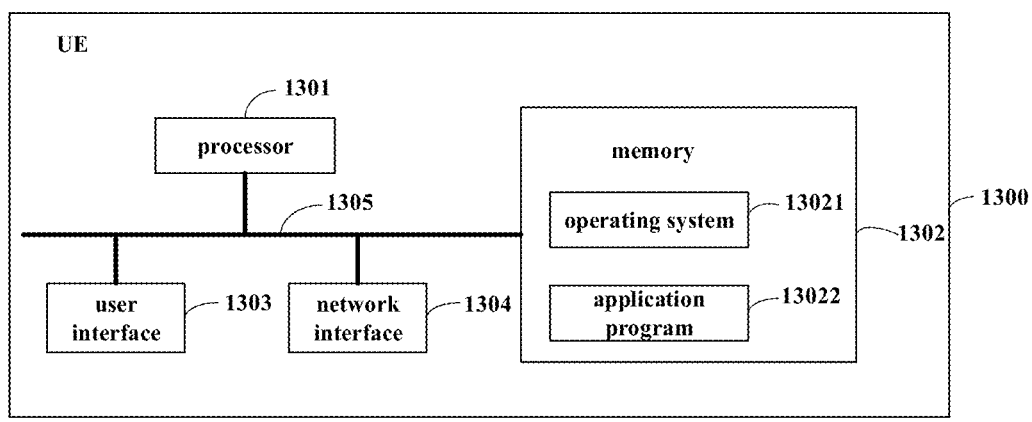
FIG. 13 is another schematic structural diagram of a user equipment according to an embodiment of the present disclosure.

As shown in FIG. 13, the UE 1300 includes at least one processor 1301, a memory 1302, at least one network interface 1304, and a user interface 1303. The various components in the UE 1300 are coupled together through a bus system 1305. It can be understood that the bus system 1305 is configured to implement connection and communication among these components. The bus system 1305 includes a data bus, a power bus, a control bus, and a status signal bus. However, for the sake of clarity, various buses are marked as the bus system 1305 in FIG. 13.

The user interface 1303 may include a display, a keyboard, or a pointing device (for example, a mouse, a trackball, a touchpad, or a touch screen).

It can be understood that the memory 1302 in the embodiment of the present disclosure may be a volatile memory or a non-volatile memory, or may include both volatile and non-volatile memory. Among them, the non-volatile memory may be a read-only memory (ROM), a programmable read-only memory (Programmable ROM, PROM), an erasable programmable read-only memory (Erasable PROM, EPROM), Erasable programmable EPROM (EEPROM) or flash memory. The volatile memory may be a Random Access Memory (RAM), which is used as an external cache. By way of example, but not limitation, many forms of RAM are available, such as static random access memory (SRAM), dynamic random access memory (DRAM), synchronous dynamic random access memory (Synchronous DRAM, SDRAM), double data rate synchronous dynamic random access memory (Double Data rate SDRAM, DDRSDRAM), enhanced synchronous dynamic random access memory (Enhanced SDRAM, ESDRAM), synchronous connection dynamic random access memory (Synchlink DRAM, SLDRAM) and direct memory bus random access memory (Direct Rambus RAM, DRRAM). The memory 1302 of the systems and methods described in embodiments of the present disclosure is intended to include, but is not limited to, these and any other suitable types of memory.

In some implementations, the memory 1302 stores the following elements, executable modules or data structures, or their subsets, or their extended sets: an operating system 13021 and an application program 13022.

The operating system 13021 includes various system programs, such as a framework layer, a core library layer, and a driver layer, etc., and is used to implement various basic services and process hardware-based tasks. The application program 13022 includes various application programs, such as a media player and a browser, and is used to implement various application services. A program for implementing the method of the embodiment of the present disclosure may be included in the application program 13022.

In the embodiment of the present disclosure, by calling a program or instruction stored in the memory 1302, specifically, the program or instruction stored in the application 13022, the following steps are implemented: determining a blind detection period parameter of a downlink control channel, and detecting and receiving the downlink control channel based on the blind detection period parameter of the downlink control channel.

An embodiment of the present disclosure also provides a computer-readable storage medium having a computer program stored thereon, when executed by a processor, implements the steps in the method of transmitting a downlink control channel as described above; or implements the method of detecting and receiving the downlink control channel.

The steps of the method or algorithm described in the present disclosure may be implemented in a hardware manner, or may be implemented in a manner that a processor executes software instructions. The software instructions may include corresponding software modules, and the software modules may be stored in RAM, flash memory, ROM, EPROM, EEPROM, registers, hard disk, mobile hard disk, read-only optical disk, or any other form of storage medium in the art. An exemplary storage medium is coupled to the processor such that the processor can read information from the storage medium and write information to the storage medium. Of course, the storage medium may also be a part of the processor. The processor and the storage medium may reside in Application Specific Integrated Circuits (ASICs). In addition, the ASIC can be located in a core network interface device. Of course, the processor and the storage medium can also exist as discrete components in the core network interface device.

Those skilled in the art should appreciate that, in one or more of the above examples, the functions described in this disclosure may be implemented in hardware, software, firmware, or any combination thereof. When implemented in software, the functions may be stored on a computer-readable medium or transmitted as one or more instructions or codes on a computer-readable medium. The computer-readable medium includes computer storage medium and communication medium, the communication medium includes any medium used to transfer the computer program from one place to another place. The storage medium may be any available media that can be accessed by a general purpose or special purpose computer.

The specific implementation described above further describe the objects, technical solutions, and beneficial effects of the present disclosure in detail. It should be understood that the foregoing descriptions are merely specific implementation of the disclosure, and are not intended to limit the present disclosure. Any modification, equivalent replacement, and improvement made on the basis of the technical solution of the disclosure shall be included in the protection scope of the disclosure.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware. Moreover, the embodiments of the present disclosure may implemented in the form of a computer program product stored on one or more computer-readable storage medium (including but not limited to a disk storage, CD-ROM, an optical storage, etc.)

Embodiments of the present disclosure are described with reference to flowcharts and/or block diagrams of methods, devices (systems), and computer program products. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, a special-purpose computer, embedded processing device, or other programmable data processing device to produce a machine, so that the instructions executed by the processor of the computer or other programmable data processing device are used to generate devices for realizing the functions specified in one or more flowcharts and/or one or more blocks of the block diagrams.

These computer program instructions may also be stored in a computer-readable memory capable of directing a computer or other programmable data processing device to work in a particular manner such that the instructions stored in the computer-readable memory produce a manufactured article including an instruction device, the instructions device implements the functions specified in one or more flowcharts and/or one or more blocks of the block diagram.

These computer program instructions can also be loaded on a computer or other programmable data processing device, so that a series of steps can be performed on the computer or other programmable device to produce a computer-implemented process. The instructions executed by a computer or other programmable data processing device implements the functions specified in one or more flowcharts and/or one or more blocks of the block diagram.

Obviously, a person skilled in the art may make further modifications and improvements on embodiments of the disclosure without departing from the spirit of the present disclosure, and these modifications and improvements shall also fall within the scope of the present disclosure.

What is claimed is:

1. A method of transmitting a downlink control channel applied for a base station, comprising:
   determining a blind detection period parameter of the downlink control channel; and
   transmitting the downlink control channel based on the blind detection period parameter of the downlink control channel,
   wherein the blind detection period parameter of the downlink control channel at least comprises: an offset value and/or a period value, wherein the offset value indicates an offset of a time domain resource for a user equipment (UE) to detect and receive the downlink control channel within a predetermined time domain range, the period value indicates a period for the UE to detect and receive the downlink control channel, a unit of the offset value and the period value is the same as the time domain resource,
   wherein the transmitting the downlink control channel based the blind detection period parameter of the downlink control channel comprises:
   determining a time domain resource for transmitting the downlink control channel based on the offset value and/or the period value;
   transmitting the downlink control channel on the time domain resource, wherein the determining a time domain resource for transmitting the downlink control channel based on the offset value and the period value comprises:
determining the time domain source for transmitting downlink control channel by using a formula $(W \times n_f \times 2^k + n_s - T_{offset}) \bmod T_{period} = 0$;
wherein W is a predetermined time domain range,
$n_f$ is a serial number of the predetermined time domain range,
$2^k$ is a quantity of time domain resources corresponding to different subcarrier spacings (SCSs) within a predetermined time unit, k being a parameter related to a subcarrier spacing in the predetermined time domain range,
$n_s$ is a serial number of the time domain resource within the predetermined time domain rang,
$T_{offset}$ is the offset value, and
$T_{period}$ is the period value.

2. The method according to claim 1, wherein the blind detection period parameter of the downlink control channel is a predetermined blind detection period parameter of the downlink control channel.

3. The method according to claim 1, wherein the blind detection period parameter of the downlink control channel is configured by the base station.

4. The method according to claim 3, wherein the offset value is configured as an arbitrary integer less than a maximum number of time domain resources included in a predetermined time domain range.

5. The method according to claim 3, wherein the offset value is configured to be selected from a specific set of offset values.

6. The method according to claim 5, wherein the specific set of offset values is configured by the base station, or the specific set of offset values is defined through a protocol.

7. The method according to claim 3, wherein the period value is configured to be selected from a predetermined set of period values.

8. The method according to claim 3, further comprising:
notifying the UE of the blind detection period parameter of the downlink control channel,
wherein the notifying the UE of the blind detection period parameter of the downlink control channel comprises:
transmitting the blind detection period parameter of the downlink control channel to the UE through high layer signaling or master information block (MIB) information.

9. The method according to claim 1, wherein the predetermined time domain range is continuous time units in the time domain.

10. A method of detecting and receiving a downlink control channel applied for a UE, comprising:
determining a blind detection period parameter of the downlink control channel; and
detecting and receiving the downlink control channel based on the blind detection period parameter of the downlink control channel,
wherein the blind detection period parameter of the downlink control channel at least comprises: an offset value and/or a period value, wherein the offset value indicates an offset of a time domain resource for the UE to detect and receive the downlink control channel within a predetermined time domain range, the period value indicates a period for the UE to detect and receive the downlink control channel, a unit of the offset value and the period value is the same as the time domain resource, wherein the detecting and receiving the downlink control channel based the blind detection period parameter of the downlink control channel comprises:
determining a time domain resource for detecting and receiving the downlink control channel based on the offset value and/or the period value;
detecting and receiving the downlink control channel on the time domain resource,
wherein the determining a time domain resource for detecting and receiving the downlink control channel based on the offset value and the period value comprises:
determining the time domain source for detecting and receiving downlink control channel by using a formula $(W \times n_f \times 2^k + n_s - T_{offset}) \bmod T_{period} = 0$;
wherein W is a predetermined time domain range,
$n_f$ is a serial number of the predetermined time domain range,
$2^k$ is a quantity of time domain resources corresponding to different subcarrier spacings (SCSs) within a predetermined time unit, k being a parameter related to a subcarrier spacing in the predetermined time domain range,
$n_s$ is a serial number of the time domain resource within the predetermined time domain rang,
$T_{offset}$ is the offset value, and
$T_{period}$ is the period value.

11. The method according to claim 10, wherein the blind detection period parameter of the downlink control channel is a predetermined blind detection period parameter of the downlink control channel.

12. The method according to claim 10, wherein the determining a blind detection period parameter of the downlink control channel comprises:
receiving the blind detection period parameter of the downlink control channel configured by the base station.

13. The method according to claim 12, wherein the receiving the blind detection period parameter of the downlink control channel configured by the base station comprises:
receiving high layer signaling or master information block (MIB) information including the blind detection period parameter of the downlink control channel.

14. The method according to claim 12, wherein the offset value is configured as an arbitrary integer less than a maximum number of time domain resources included in a predetermined time domain range.

15. The method according to claim 12, wherein the offset value is configured to be selected from a specific set of offset values.

16. The method according to claim 15, wherein the specific set of offset values is configured by the base station, or the specific set of offset values is defined through a protocol.

17. The method according to claim 12, wherein the period value is configured to be selected from a predetermined set of period values.

18. The method according to claim 12, wherein the predetermined time domain range is continuous time units in the time domain.

19. A base station, comprising a memory, a processor, a transceiver and a computer program stored in the memory and executed by the processor, wherein the processor is configured to execute the computer program so as to implement the method of transmitting a downlink control channel according to claim 1.

20. A UE, comprising a memory, a processor, a transceiver, and a computer program stored in the memory and executed by the processor, wherein the processor is configured to execute the computer program so as to implement the method of detecting and receiving a downlink control channel according to claim 10.

\* \* \* \* \*